United States Patent [19]

Stroh

[11] Patent Number: 5,813,120
[45] Date of Patent: Sep. 29, 1998

[54] FOOD UTENSIL AND GRATE CLEANING TOOL

[76] Inventor: Emanuel A. Stroh, P.O. Box 195, Manning, N. Dak. 58642

[21] Appl. No.: 868,003

[22] Filed: May 3, 1997

[51] Int. Cl.⁶ ............................. A47J 33/00; A47J 34/00
[52] U.S. Cl. .................................. 30/123; 30/142; 30/322
[58] Field of Search ............................. 30/123, 322–323, 30/169, 142

[56] References Cited

U.S. PATENT DOCUMENTS

| | | | |
|---|---|---|---|
| 1,579,495 | 4/1926 | Stroud | 30/169 |
| 2,297,566 | 9/1942 | Laux | 30/169 |
| 2,747,911 | 5/1956 | Kuever | 30/169 X |
| 3,162,475 | 12/1964 | Van Allen | 30/322 X |

*Primary Examiner*—Douglas D. Watts
*Attorney, Agent, or Firm*—David A. Lingbeck

[57] ABSTRACT

A food utensil and grate cleaning tool includes an elongate shaft having a first end and a second end, a handle at the first end, and a hook portion at the second end and being continuous with the elongate shaft. The hook portion has a tapered and pointed end for pierces and hooking onto food such as corn on the cob, steak being grilled, and pickles in a jar, and further has an inside edge and a bladed edge along the inside edge for scraping and cleaning grates or grills. Also, the hook portion generally lies in a plane which is generally perpendicular to the elongate shaft and is capable of moving in the plane upon rotation of the elongate shaft about its longitudinal axis. Further, the user can move the bladed edge along the grate or grill for the scraping and cleaning thereof.

3 Claims, 1 Drawing Sheet

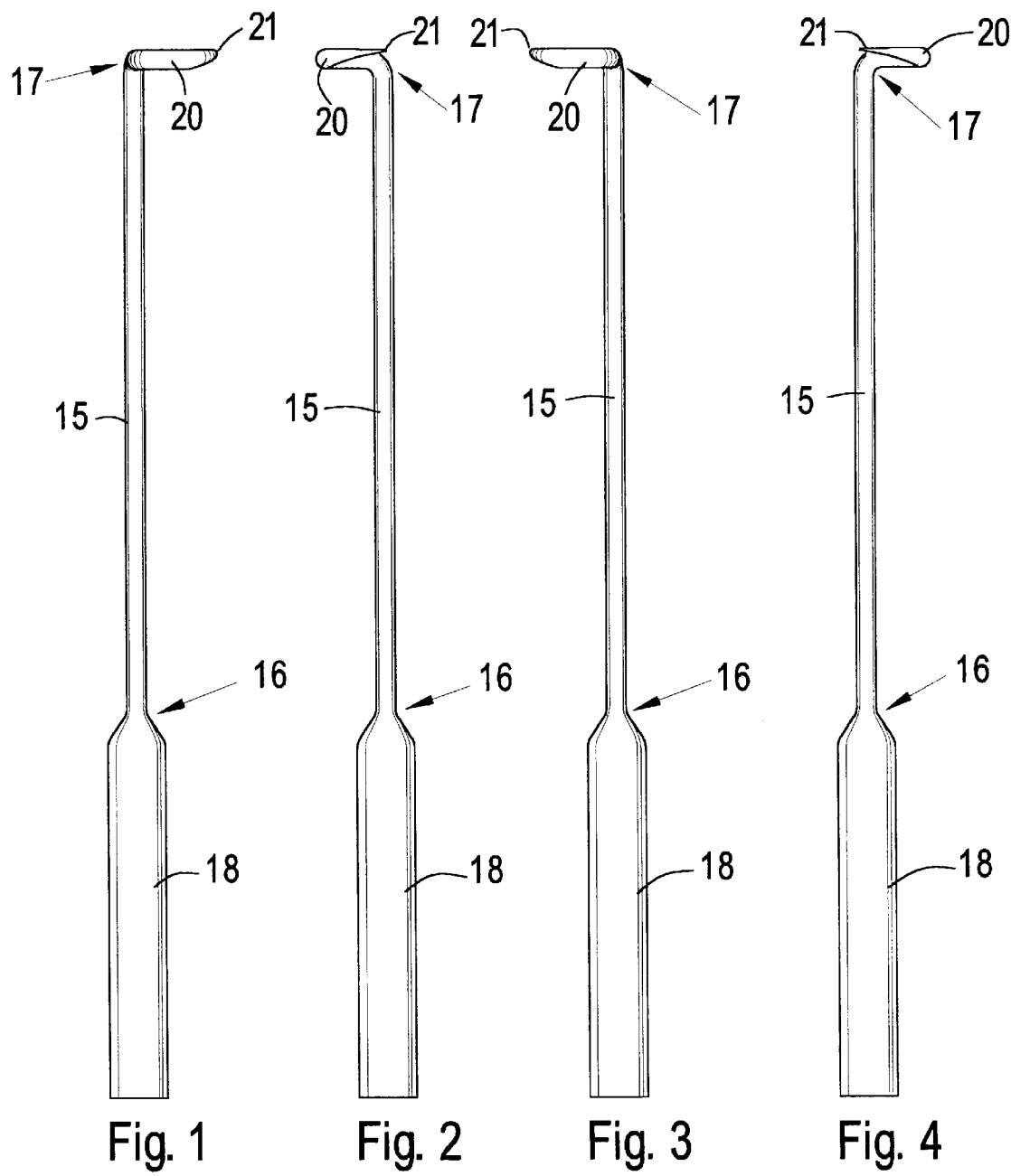

FOOD UTENSIL AND GRATE CLEANING TOOL

BACKGROUND OF THE INVENTION

This invention relates to a food utensil and grate cleaning tool which allows the user to conveniently and quickly pick up and hold certain hard to pick up foods including corn on the cob, steaks being grilled, and pickles inside a jar.

Most foods are picked up and eaten with certain types of eating utensils. Spoons, forks, and knives are the most commonly known and used eating utensils. Other types of food utensil include ladles, long-shafted skewers, long-shafted tongs, many shaped spatulas, and long-shafted utensils having a pair of tines extending from an end thereof and capable of picking up and holding food in between thereof. There are, however, certain types of foods which are very difficult to pick up and hold using these conventional eating utensils especially foods which are either hot or are stored in jars filled with sticky fluids. For example, corn on the cob being boiled in a pot is very difficult to pick up with a fork. The best way to pick up the cob is to do so at its ends where it is generally softer than along the length of the cob, and in order to use a fork, the cob has to be put up on its end in the pot so that the user can stick the fork in one of its ends. It is also to pick up steaks being grilled on a grill with a fork, because the tines of the fork are not sharp enough for the user to easily pierce the steaks in order to pick them up.

None of the known conventional eating utensils suggest nor describe the food utensil and grate cleaning tool, nor are they capable of performing to the extent of the food utensil and grate cleaning tool.

SUMMARY OF THE INVENTION

The present invention relates to a food utensil and grate cleaning utensil which comprises an elongate shaft, a handle at a first end of the shaft, and a hook portion at a second end of the shaft, the hook portion being essentially curved back around relative to itself and having a tapered and pointed end and a bladed edge along the inside edge of the hook portion. The tapered and pointed end is generally used to hook the food so that the user can, for example, either turn steaks on grills, retrieve pickles out of a jar, or hold a cooked corn on the cob while eating it. The bladed edge allows the user to scrape and clean the individual elongate members of a grate.

One objective of the present invention is to provide a food utensil and grate cleaning tool which allows the user to easily and quickly pick up food which is otherwise hard for the user to do so with the more conventional eating utensils.

Another objective of the present invention is to provide a food utensil and grate cleaning tool which not only picks up food but also can be used to clean the elongate members of a grate or barbecue grill.

Further objectives and advantages of the present invention will become apparent as the description proceeds and when taken in conjunction with the accompanying drawings wherein:

BRIEF DESCRIPTION OF THE DRAWINGS

FIG. 1 is a rear side elevational view of the food utensil and grate cleaning tool.

FIG. 2 is a front side elevational view of the food utensil and grate cleaning tool showing the counterclockwise curvature of the hook portion.

FIG. 3 is a right side elevational view of the food utensil and grate cleaning tool.

FIG. 4 is a front side elevational view of the food utensil and grate cleaning tool showing the clockwise curvature of the hook portion.

FIG. 5 is a second end view of the food utensil and grate cleaning tool.

FIG. 6 is a first end view of the food utensil and grate cleaning tool.

DETAILED DESCRIPTION OF THE INVENTION

Referring to the drawings in FIGS. 1–6, in particular, a food utensil and grate cleaning tool comprises an elongate shaft 15 capable of being various lengths and having a first end 16 and a second end 17, a handle 18 at the first end 16 of the elongate shaft 15, and an arcuate hook portion 20 at the second end 17, the hook portion 20 being generally C-shaped and having a tapered and pointed end 21 opposed to where the elongate shaft 15 is continuous to the hook portion 20 and further having a curved bladed edge 25 along a portion of the inside edge 22 of the hook portion 20 which generally lies in a plane which is generally perpendicular to the elongate shaft 15 and which is capable of being moved in the plane for setting the hook in the food upon rotation of the elongate shaft 15 about its longitudinal axis. The hook portion 20 curves either in a clockwise or counterclockwise manner relative to the elongate shaft 15 and as such can be used by right-handed and left-handed people. The tapered and pointed end 21 is of a substantial sharp point adapted to pierce the types of foods which are otherwise very difficult to pierce with conventional eating utensils. Also, the tapered and pointed end 21 allows the user to pierce and hook particular food such as corn on the cob, steak, and pickles. The bladed edge 25 of the hook portion 20 allows the user to scrape and clean a grill, in particular, the elongate members of the grate.

To use the food utensil and grate cleaning tool to hook and pick up food, the user grasps the handle 18 and pierces the food with the pointed end 21, and to ensure that the food is securely hooked so that the user can pick up the food, the user rotates the handle 18 in the direction of the curvature of the hook portion 20 to set the hook portion 20 in the food. To release and let go of the food, the user rotates the handle 18 in the reverse direction which removes the hook portion 20 from in the food.

To use the food utensil and grate cleaning tool to scrape and clean the elongate members of the grate or grill, the user grasps the handle 18 and positions the hook portion 20 of the tool such that the bladed edge 25 is facing the side of the elongate member to be scraped and cleaned and then brings the bladed edge 25 in contact with the elongate member and slides the bladed edge 25 along the elongate member to scrape off the food matter crusted thereon. In most cases the elongate members of the grate or grill are spaced sufficient to allow the user to position the bladed edge 25 of the hook portion 20 to any of the sides of the elongate member of the grate in order to completely scrape and clean the grate members.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A food utensil and grate cleaning tool comprising:

an elongate shaft having a first end and a second end;

a handle at said first end; and a hook portion at said second end, said hook portion having a tapered and pointed end for hooking onto and retrieving food and further having an inside edge and a bladed edge along said inside edge, said hook portion essentially being C-shaped, further said hook portion lying generally in a plane and being adapted to move in said plane upon rotation of said elongate shaft about its longitudinal axis.

2. A food utensil and grate cleaning tool as described in claim 1, wherein said hook portion generally lies in said plane which is generally perpendicular to said elongate shaft.

3. A food utensil and grate cleaning tool as described in claim 2, wherein said hook portion is curved either clockwise or counterclockwise relative to said elongate shaft.

\* \* \* \* \*